J. WASH.

Bee Hive.

No. 56,127.

Patented July 3, 1866.

Witnesses
J. W. B. Covington
Jas. A. Service.

Inventor
James Wash
Per Munn & Co
Attys

UNITED STATES PATENT OFFICE.

JAMES WASH, OF MOUNT STERLING, ILLINOIS.

IMPROVEMENT IN BEE-HIVES.

Specification forming part of Letters Patent No. 56,127, dated July 3, 1866.

*To all whom it may concern:*

Be it known that I, JAMES WASH, of Mount Sterling, in the county of Brown and State of Illinois, have invented a new and Improved Bee Passage and Protector; and I do hereby declare that the following is a full, clear, and exact description thereof, which will enable others skilled in the art to make and use the same, reference being had to the accompanying drawings, forming part of this specification, in which—

Figure 1:
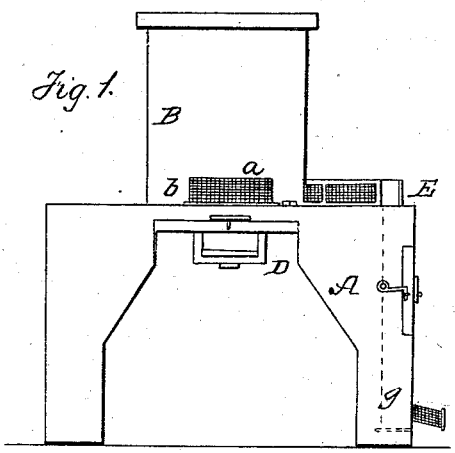
Figure 2:
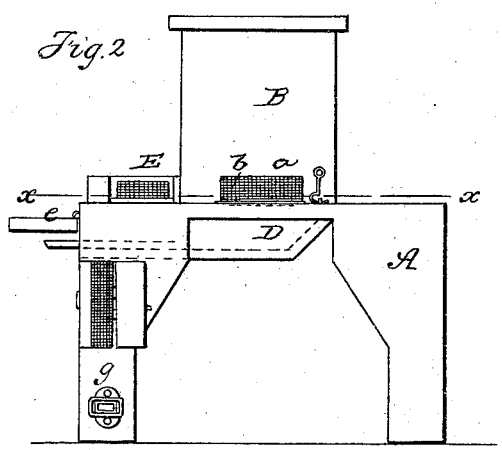
Figure 3:
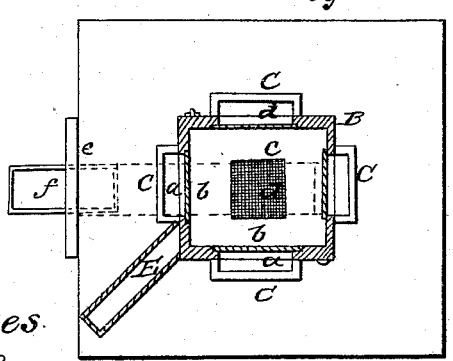

Figures 1 and 2 are side views of my invention; Fig. 3, a horizontal section of the same, taken in the line $x\ x$, Fig. 2.

Similar letters of reference indicate like parts.

This invention is designed to protect bees from the moth by preventing the millers from effecting an entrance into the hive; and to this end the invention consists in the employment or use of a tube applied to the hive in such a manner that the entrance will be at some distance from the hive, and having the latter provided with decoys composed of openings covered with wire-gauze, said openings being directly over vats or receptacles supplied with grease or oil, or any substance which will destroy the millers as they drop into it, all being arranged as hereinafter fully shown and described.

A represents a stand or support, on which the hive B is placed, the platform or top of the stand being sufficiently large to extend considerably beyond the hive at all sides thereof.

The hive B may be constructed in any of the known forms, and it has a rectangular notch or opening, $a$, made in the lower edge of each side, said openings being covered with wire-gauze $b$.

In the upper surface of the top of the platform of the stand A there are placed vats C, the latter being directly below the openings $a$ in the hive, and filled with fluid grease, oil, or other substance which will destroy the millers as they drop into it. A hole, C, is also made in the center of the top of the stand, said hole being covered with wire-cloth $d$; and D is a trunk or box attached to the under side of the top of the stand, extending out to one side of the same, and having a door, $e$, at its outer end. Within this trunk or box D there is placed a pan or vessel, $f$, also supplied with fluid grease, oil, or other substance which will destroy the millers as they drop or fall into it. This trunk or box D, with the hole $c$, which is under the center of the hive, are designed for ventilation.

The passage of air into the hive through the trunk or box D may be stopped at any time by closing the door $e$.

E represents a tube, one end of which communicates with the lower part of the hive. This tube extends along over the top of the stand A to an angle or corner thereof, and then extends down at the inner side of one of the legs $g$, and extends laterally through said leg near its lower end, the outer end of the tube being of flaring form to afford an easy entrance for the bees; and this end I design to have made of wire-gauze, so that the air may pass freely through it and keep it deprived of any odor it might otherwise receive from the bees, and which would have a tendency to allure the millers to it.

The millers will be attracted to the openings $a$. They will naturally endeavor to effect an entrance at these places, and in so doing will fall into the vats C and be destroyed. They will also fall into the pan or vessel $f$ in the trunk or box D in endeavoring to effect an entrance into the hole $c$.

The tube E may have openings made in it at different points, said openings being covered with wire-cloth. This tube may be placed in different positions and arranged in various ways, as circumstances may require. The main feature to be observed is to have its entrance at such a point that the millers will not be liable to be attracted to it.

Having thus described my invention, what I claim as new, and desire to secure by Letters Patent, is—

The combination of the vats C, trunk D, door $e$, tube E, and leg $g$, table A, and hive B, constructed and arranged in the manner and for the purpose herein specified.

JAMES WASH.

Witnesses:
W. L. VANDEVENTER,
JAMES H. WALLIN.